US012230764B2

(12) United States Patent
Tomizawa et al.

(10) Patent No.: US 12,230,764 B2
(45) Date of Patent: Feb. 18, 2025

(54) ALL SOLID BATTERY (71) Applicant: TAIYO YUDEN CO., LTD., Tokyo (JP)

(72) Inventors: Sachie Tomizawa, Tokyo (JP); Daigo Ito, Tokyo (JP); Chie Kawamura, Tokyo (JP); Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 264 days.

(21) Appl. No.: 16/899,539

(22) Filed: Jun. 11, 2020

(65) Prior Publication Data
US 2020/0403274 A1 Dec. 24, 2020

(30) Foreign Application Priority Data
Jun. 21, 2019 (JP) .................................. 2019-115730

(51) Int. Cl.
*H01M 10/0562* (2010.01)
*H01M 4/62* (2006.01)
*H01M 10/0585* (2010.01)

(52) U.S. Cl.
CPC ....... *H01M 10/0585* (2013.01); *H01M 4/625* (2013.01); *H01M 10/0562* (2013.01); *H01M 2300/0071* (2013.01)

(58) Field of Classification Search
CPC ........... H01M 8/1226; H01M 10/0562; H01M 4/625; H01G 9/15
See application file for complete search history.

(56) References Cited

U.S. PATENT DOCUMENTS

| 5,958,623 | A | 9/1999 | Kozawa et al. ............ 429/231.8 |
| 2005/0064289 | A1* | 3/2005 | Suzuki .................. H01M 4/139 |
| | | | 252/182.1 |
| 2015/0044575 | A1* | 2/2015 | Kawaji ............... H01M 10/052 |
| | | | 252/62.2 |
| 2015/0311507 | A1 | 10/2015 | Miki et al. |
| 2018/0062165 | A1 | 3/2018 | Oono et al. ........... H01M 4/366 |
| 2018/0083279 | A1 | 3/2018 | Takami et al. ........ H01M 4/525 |
| 2018/0090748 | A1* | 3/2018 | Mochizuki .............. H01M 4/62 |

(Continued)

FOREIGN PATENT DOCUMENTS

| JP | H 10-241677 A | 9/1998 |
| JP | 2012-119078 A | 6/2012 |
| JP | 2013-51078 A | 3/2013 |

(Continued)

OTHER PUBLICATIONS

Office Action issued on Dec. 26, 2023 in a counterpart Chinese Patent Application No. 202010528179.3.

*Primary Examiner* — Tabassom Tadayyon Eslami
(74) *Attorney, Agent, or Firm* — Stein IP, LLC (57) ABSTRACT An all solid battery includes: a solid electrolyte layer of which a main component is oxide-based solid electrolyte; a first electrode layer that is provided on a first main face of the solid electrolyte layer and includes an active material; and a second electrode layer that is provided on a second main face of the solid electrolyte layer and includes an active material, wherein at least one of the first electrode layer and the second electrode layer includes an aggregate of carbon particles and a cavity, wherein the aggregate demarcates at least a part of the cavity.

11 Claims, 6 Drawing Sheets (56) References Cited

U.S. PATENT DOCUMENTS

2019/0006674 A1* 1/2019 Sasaki ................ H01G 11/38
2019/0020057 A1  1/2019 Fujisawa

FOREIGN PATENT DOCUMENTS

| JP | 2017-212123 A | 11/2017 |
| WO | WO 2014/003036 A1 | 1/2014 |
| WO | WO 2017/149927 A1 | 9/2017 |

* cited by examiner

| | AVERAGE DIAMETER | BET ($m^2/g$) | ADDED AMOUNT | LOOSENING LEVEL | AGGREGATE AVERAGE DIAMETER (μm) | CAVITY /AGGREGATE | AGGREGATE /WHOLE | CAVITY |
|---|---|---|---|---|---|---|---|---|
| COMPARATIVE EXAMPLE 1 | 20nm | 80 | 5wt% | MAX | 0.3 | 2% | 5% | × |
| EXAMPLE 1 | 20nm | 80 | 5wt% | LARGE | 0.7 | 5% | 7% | ○ |
| EXAMPLE 2 | 20nm | 80 | 5wt% | MIDDLE | 2.5 | 26% | 10% | ◎ |
| EXAMPLE 3 | 20nm | 80 | 25wt% | MIDDLE | 3.8 | 26% | 43% | ◎ |
| EXAMPLE 4 | 20nm | 80 | 30wt% | MIDDLE | 7.4 | 24% | 50% | ○ |
| EXAMPLE 5 | 20nm | 80 | 5wt% | SMALL | 8.9 | 70% | 15% | ◎ |
| EXAMPLE 6 | 80nm | 10 | 5wt% | SMALL | 9.5 | 30% | 9% | ◎ |

| | CYCLE CHARACTERISTIC | ELECTRON CONDUCTIVITY | IONIC CONDUCTIVITY | OVERALL DETERMINATION |
|---|---|---|---|---|
| COMPARATIVE EXAMPLE 1 | × | ○ | ○ | × |
| EXAMPLE 1 | ○ | ◎ | ○ | ○ |
| EXAMPLE 2 | ◎ | ◎ | ◎ | ◎ |
| EXAMPLE 3 | ○ | ◎ | ◎ | ◎ |
| EXAMPLE 4 | ◎ | ○ | △ | ○ |
| EXAMPLE 5 | ◎ | ○ | ○ | ○ |
| EXAMPLE 6 | ◎ | ○ | ○ | ○ |

ID BATTERY

CROSS-REFERENCE TO RELATED APPLICATION

This application is based upon and claims the benefit of priority of the prior Japanese Patent Application No. 2019-115730, filed on Jun. 21, 2019, the entire contents of which are incorporated herein by reference.

FIELD

A certain aspect of the present invention relates to an all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed.

SUMMARY OF THE INVENTION

It is thought that for the purpose of securing electron conductivity, Pd (palladium) is used as conductive auxiliary agent of electrode layers, with use of characteristic in which Pd hardly reacts each material. However, Pd in the electrode layers suppresses increasing of an amount of an added active material in the electrode layers. And so, it is preferable that carbon is used as the conductive auxiliary agent of the electrode layers (for example, see Japanese Patent Application Publication No. 2017-212123 hereinafter referred to as Document 1). However, when the carbon is used as the conductive auxiliary agent of the electrode layers, ionic conductivity may be degraded.

However, when the carbon is added to the electrode layer, reaction between the carbon and oxide-based solid electrolyte during a firing process may degrade the ionic conductivity of solid electrolyte layers. When the carbon is excessively dispersed in the electrode layers, an amount of conductive network formed by the conductive assistant may be reduced. In this case, the electron conductivity of the electrode layers may be regraded. And, in an oxide-based all solid battery formed by sintering, volume expansion contraction of an active material caused by discharge and charge causes degradation of long-term cycle stability.

Document 1 disclose a method for suppressing the reaction by using alumina coating. However, cost may increase. Capacity density may be degraded. And, conductivity may be degraded. The problem of the volume expansion contraction may not be necessarily solved.

The present invention has a purpose of providing an all solid battery that is capable of suppressing cost and improving performance.

According to an aspect of the present invention, there is provided an all solid battery including: a solid electrolyte layer of which a main component is oxide-based solid electrolyte; a first electrode layer that is provided on a first main face of the solid electrolyte layer and includes an active material; and a second electrode layer that is provided on a second main face of the solid electrolyte layer and includes an active material, wherein at least one of the first electrode layer and the second electrode layer includes an aggregate of carbon particles and a cavity, wherein the aggregate demarcates at least a part of the cavity.

DETAILED DESCRIPTION

A description will be given of an embodiment with reference to the accompanying drawings.

Figure 1:
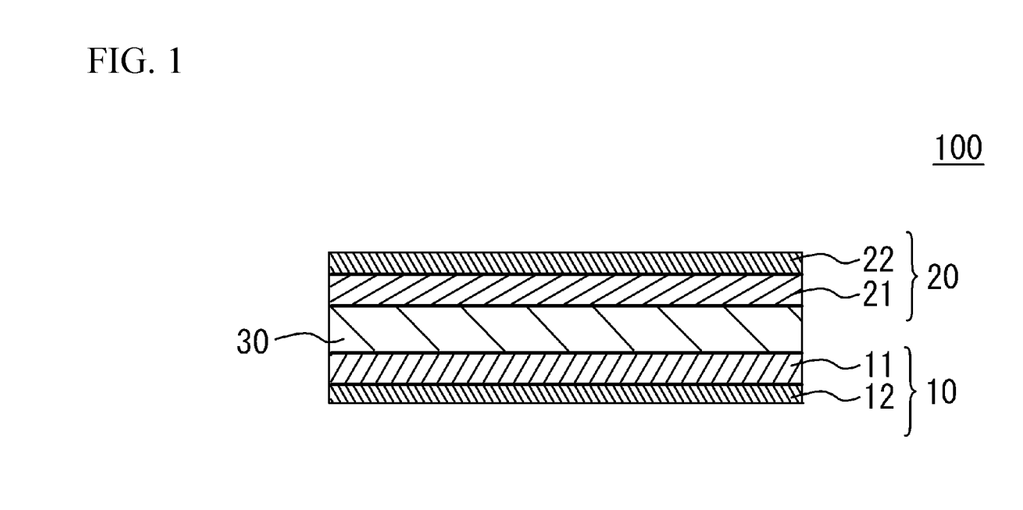
FIG. 1 illustrates a schematic cross section of a basic structure of an all solid battery.

(Embodiment) FIG. 1 illustrates a schematic cross section of a basic structure of an all solid battery 100 in accordance with an embodiment. As illustrated in FIG. 1, the all solid battery 100 has a structure in which a first electrode 10 and a second electrode 20 sandwich an oxide-based solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provided on a second main face of the solid electrolyte layer 30. The second electrode 20 has a structure in which a second electrode layer 21 and a second electric collector layer 22 are stacked. The second electrode layer 21 is on the solid electrolyte layer 30 side.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

At least, the solid electrolyte layer 30 is an oxide-based solid electrolyte. For example, phosphoric acid salt-based electrolyte having a NASICON structure may be used for the solid electrolyte layer 30. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1-x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first electrode layer 11 and the second electrode layer 21 include phosphoric acid salt including Li and a transition metal other than Co, it is preferable that the solid electrolyte layer 30 includes Li—Al—Ge—$PO_4$-based material in which the transition metal is added in advance.

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first electrode layer 11 and the second electrode layer 21, moreover, oxide-based solid electrolyte material or a conductive material (conductive auxiliary agent) may be added. When the material is evenly dispersed into water or organic solution together with binder or plasticizer, paste for electrode layer is obtained. In the embodiment, the electrode layer paste includes a carbon material as the conductive auxiliary agent. Moreover, the electrode may include a metal as the conductive auxiliary agent. Pd, Ni, Cu, or Fe, or an alloy thereof may be used as a metal of the conductive auxiliary agent.

The first electric collector layer 12 and the second electric collector layer 22 are made of a conductive material.

Figure 2:
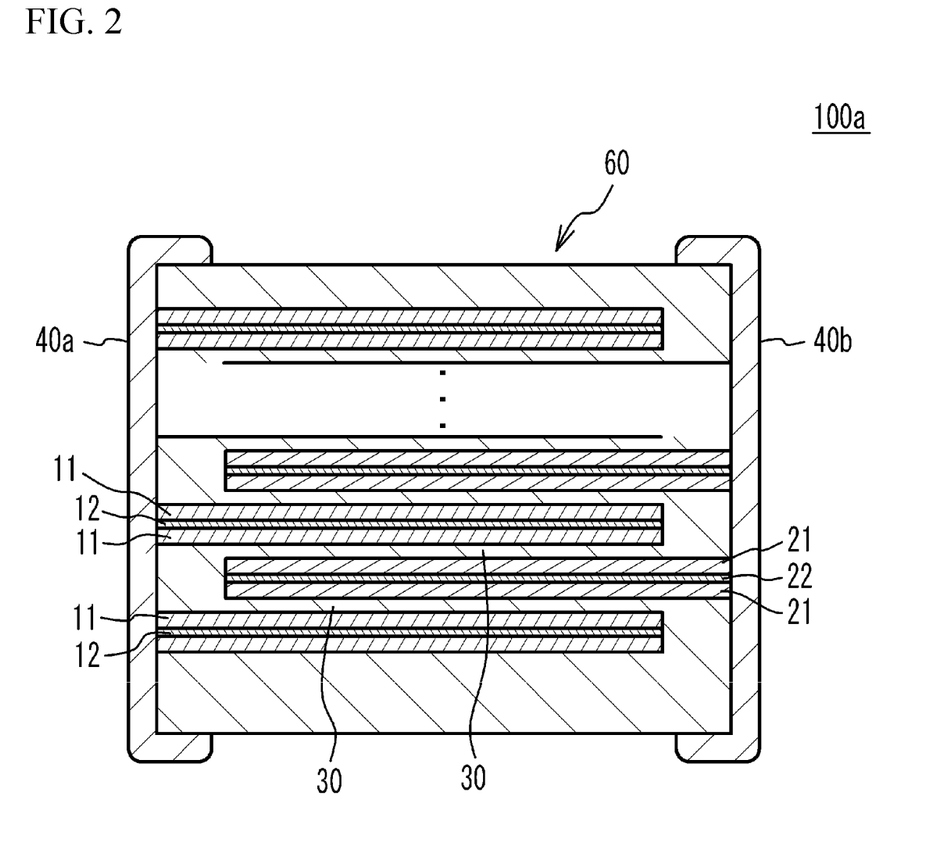
FIG. 2 illustrates a schematic cross section of another all solid battery.

FIG. 2 illustrates a schematic cross section of an all solid battery 100a in which a plurality of cell units are stacked. The all solid battery 100a has a multilayer chip 60 having a rectangular parallelepiped shape, a first external electrode 40a provided on a first edge face of the multilayer chip 60, and a second external electrode 40b provided on a second edge face facing with the first edge face.

In four faces other than the two end faces of the multilayer chip 60, two faces other than an upper face and a lower face of the multilayer chip 60 in a stacking direction are referred to as side faces. The first external electrodes 40a and the second external electrode 40b extend to the upper face, the lower face and the two side faces of the multilayer chip 60. However, the first external electrode 40a and the second external electrode 40b are spaced from each other.

In the following description, the same numeral is added to each member that has the same composition range, the same thickness range and the same particle distribution range as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first electrode layer 11 is stacked on the first electric collector layer 12. The solid electrolyte layer 30 is stacked on the first electrode layer 11. The solid electrolyte layer 30 extends from the first external electrode 40a to the second external electrode 40b. The second electrode layer 21 is stacked on the solid electrolyte layer 30. The second electric collector layer 22 is stacked on the second electrode layer 21. Another second electrode layer 21 is stacked on the second electric collector layer 22. Another solid electrolyte layer 30 is stacked on the second electrode layer 21. The solid electrolyte layer 30 extends from the first external electrode 40a to the second external electrode 40b. The first electrode layer 11 is stacked on the solid electrolyte layer 30. In the all solid battery 100a, the stack units are repeatedly stacked. Therefore, the all solid battery 100a has a structure in which a plurality of cell units are stacked.

It is thought that Pd is used as a conductive auxiliary agent of the first electrode layer 11 and the second electrode layer 21, with use of characteristic in which Pd hardly reacts each material. However, it is preferable that a ratio of Pd in the first electrode layer 11 and the second electrode layer 21 is 20 vol. % to 50 vol. %, from a viewpoint of achieving conductive network in the electrode layers by spheroidizing of Pd and grain growing of Pd in the firing process. And, Pd prevents increasing of the amount of added active material in the electrode layers, when the volume fractional ratio of Pd is increased. Clarke number of Pd is extremely small. Therefore, Pd is very expensive. And so, it is preferable that a carbon material is used as the conductive auxiliary agent of the first electrode layer 11 and the second electrode layer 21. On the other hand, carbon is not spheroidized during a firing. And, grains of carbon does not grow during the firing. Therefore, carbon hardly prevents increasing of the amount of the added active material in the electrode layers, because carbons achieves high conductivity with a less volume fractional ratio. Moreover, carbon is not expensive.

However, the carbon material tends to adsorb the liquid phase of the glass component during liquid-phase sintering of the solid electrolyte layer 30. When the carbon material adsorbs the liquid phase of the glass component, dense degree of the solid electrolyte layer 30 is reduced because of prevention of sintering of the solid electrolyte layer 30 or composition gap of the solid electrolyte layer 30. And, ionic conductivity of the solid electrolyte layer 30 may be degraded. That is, when the carbon material is added to the first electrode layer 11 and the second electrode layer 21, the reaction between the carbon material and the oxide-based solid electrolyte may be a problem.

Next, when the carbon is excessively dispersed in the first electrode layer 11 and the second electrode layer 21, the structure of the conductive assistant may be broken down. And, an amount of conductive network formed by the conductive assistant may be reduced. In this case, the electron conductivity of the first electrode layer 11 and the second electrode layer 21 may be regraded. When the carbon material is excessively dispersed, location changing of the carbon material caused by sintering of ceramic may be changed.

Next, in an oxide-based all solid battery formed by sintering, volume expansion contraction of an active material caused by discharge and charge causes stress. Thereby, long-term cycle stability may be degraded.

And so, in the embodiment, at least one of the first electrode layer 11 and the second electrode layer 21 includes an aggregate of carbon particles. In the embodiment, as an example, both the first electrode layer 11 and the second electrode layer 21 include the aggregate of carbon particles.

Figure 3:
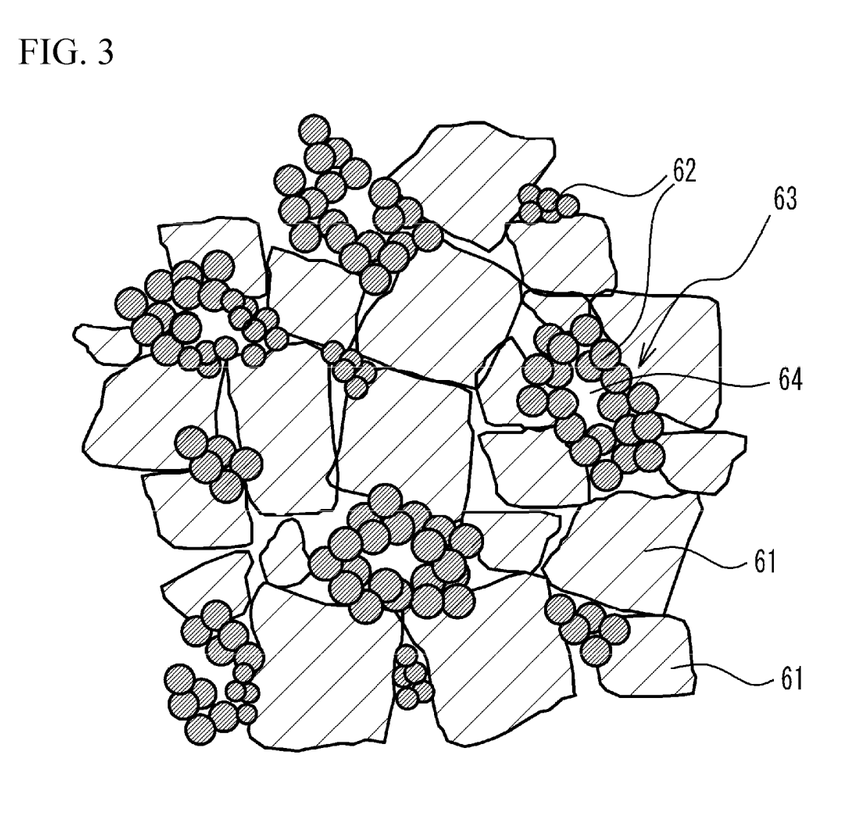
FIG. 3 illustrates a cross section of a first electrode layer and a second electrode layer.

FIG. 3 illustrates a schematic cross sectional view of the first electrode layer 11 and the second electrode layer 21. As illustrated in FIG. 3, the first electrode layer 11 and the second electrode layer 21 have a polycrystalline structure including a plurality of ceramic crystal grains 61 such as an electrode active material and an oxide-based solid electrolyte material. An aggregate 63 of carbon particles 62 is located at crystal grain boundary among the plurality of ceramic crystal grains 61. The aggregate 63 houses a cavity 64. That is, the aggregate 63 is aggregated so as to surround the cavity 64. The aggregates 63 are scattered and located at a plurality of positions in the first electrode layer 11 and the second electrode layer 21.

The aggregate 63 may not necessarily surround the cavity 64. For example, the aggregate 63 may contact a part of the cavity 64, and may demarcate a part of the cavity 64. In this case, the cavity 64 may be surrounded by the aggregate 63 and the ceramic crystal grains 61.

The carbon particles 62 form the aggregate 63. Therefore, dispersion of the carbon particles 62 is suppressed. In this case, an existence ratio of the carbon material is reduced at an interface between the first electrode layer 11 and the second electrode layer 21, and the solid electrolyte layer 30. Reaction between the carbon particles 62 and the oxide-based solid electrolyte is suppressed. Therefore, sintering prevention or composition shift of the solid electrolyte layer 30 is suppressed, and density degree of the solid electrolyte layer 30 is improved. And ionic conductivity is improved.

Next, when the dispersion of the carbon particles 62 is suppressed, breakdown of the structure of the conductive assistant is suppressed. And, reduction of an amount of conductive network formed by the conductive assistant is suppressed. Thus, electron conductivity of the first electrode layer 11 and the second electrode layer 21 is improved. When the dispersion of the carbon particles 62 is suppressed, location changing of the carbon particles 62 caused by sintering of ceramic is suppressed.

The cavity 64 is demarcated by the aggregate 63 more flexible than the ceramic crystal grains 61. And the cavity 64 does not include ceramic. With the structure, the volume changing of the active material during discharge and charge is absorbed by the cavity 64. And inner stress is released. Therefore, the long-term cycle stability of the all solid battery 100 and the all solid battery 100a is improved.

Accordingly, even if the carbon material is used, the ionic conductivity, the electron conductivity and the long-term cycle stability are improved. It is therefore possible to reduce cost and improve performance of the all solid battery 100 and the all solid battery 100a.

When an aggregation diameter of the aggregate 63 is small, it may not be necessarily absorb the volume changing. And so, it is preferable that the aggregation diameter of the aggregate 63 has a lower limit. In concrete, it is preferable that the aggregation diameter of the aggregate 63 is 0.5 µm or more. It is more preferable that the aggregation diameter is 1 µm or more. It is still more preferable that the aggregation diameter is 2 µm or more.

When the aggregation diameter of the aggregate 63 is large, the conductive network may be broken and the electron conductivity may be insufficient. And so, it is preferable that the aggregation diameter of the aggregate 63 has an upper limit. In concrete, it is preferable that the aggregation diameter of the aggregate 63 is 50 µm or less. It is more preferable that the aggregation diameter is 20 µm or less. It is still more preferable that the aggregation diameter is 10 µm or less.

When a diameter of the cavity 64 in the aggregate 63 is small, absorption of the volume changing of the active material may be insufficient. And so, it is preferable that the diameter of the cavity 64 has a lower limit. In concrete, it is preferable that an average diameter of the cavities 64 is 0.2 µm or more. It is more preferable that the average diameter is 0.7 µm or more. It is still more preferable that the average diameter is 1 µm or more. It is possible to calculate the average diameter of the cavities 64 by taking some SEM (BSE) images of a cross section of the all solid battery subjected to CP process so that the number of the cavity 64 is 50 in a single image and the total number of the cavity 64 is 300 or more and measuring a tangential diameter in a constant direction of the cavities 64 and calculating an average of the tangential diameters.

When the diameter of the cavity 64 in the aggregate 63 is large, water may enter the cavity portion and resistance to humidity may be degraded. And so, it is preferable that the diameter of the cavity 64 has an upper limit. In concrete, it is preferable that the diameter of the cavity 64 is 10 μm or less. It is more preferable that the diameter is 5 μm or less. It is still more preferable that the diameter is 2 μm or less.

When an area ratio of the cavity 64 in the aggregate 63 is small, following against the volume changing of the discharge and charge may not be necessarily achieved and the cycle characteristic may be degraded. And so, it is preferable that the area ratio of the cavity 64 in the aggregate 63 has a lower limit. In concrete, it is preferable that the area ratio of the cavity 64 is 10% or more. It is more preferable that the area ratio of the cavity 64 is 20% or more. It is still more preferable that the area ratio of the cavity 64 is 25% or more.

When the area ratio of the cavity 64 in the aggregate 63 is large, adhesion between the active material or the solid electrolyte and the carbon may be degraded and inner resistance may increase. And so, it is preferable that the area ratio of the cavity 64 in the aggregate 63 has an upper limit. In concrete, it is preferable that the area ratio of the cavity 64 is 80% or less. It is more preferable that the area ratio of the cavity 64 is 70% or less. It is still more preferable that the area ratio of the cavity 64 is 50% or less.

When an amount of the carbon particles 62 added to the first electrode layer 11 and the second electrode layer 21 is small, conductivity of the first electrode layer 11 and the second electrode layer 21 may be degraded. And so, it is preferable that an added amount of the carbon particles 62 has a lower limit. In concrete, it is preferable that the added amount of the carbon particles 62 is 5 wt % or more with respect to the total amount of the active material and the solid electrolyte. It is more preferable that the added amount of the carbon particles 62 is 8 wt % or more. It is still more preferable that the added amount of the carbon particles 62 is 10 wt % or more.

When the amount of the carbon particles 62 added to the first electrode layer 11 and the second electrode layer 21 is large, prevention of sintering of the first electrode layer 11 and the second electrode layer 21 may be remarkable. And so, it is preferable that the added amount of the carbon particles 62 has an upper limit. In concrete, it is preferable that the added amount of the carbon particles 62 is 80 wt % or less with respect to the total amount of the active material and the solid electrolyte. It is more preferable that the added amount of the carbon particles 62 is 50 wt % or less. It is still more preferable that the added amount of the carbon particles 62 is 40 wt % or less.

When the carbon particles 62 is small, dispersion of the carbon particles 62 in the first electrode layer 11 and the second electrode layer 21 may not be necessarily suppressed. And so, it is preferable that a primary particle average diameter of the carbon particles 62 has a lower limit and a BET value of the carbon particles 62 has an upper limit. In concrete, it is preferable that the carbon particles 62 have the primary particle diameter of 15 nm or more and the BET value of 200 $m^2/g$ or less. It is more preferable that the carbon particles 62 have the primary particle diameter of 20 nm or more and the BET value of 150 $m^2/g$ or less. It is still more preferable that the carbon particles 62 have the primary particle diameter of 20 nm or more and the BET value of 80 $m^2/g$ or less.

When the carbon particles 62 are large, the conductivity of the first electrode layer 11 and the second electrode layer 21 may be degraded. And so, it is preferable that the primary particle average diameter of the carbon particles 62 has an upper limit and the BET value of the carbon particles 62 has a lower limit. In concrete, it is preferable that the carbon particles 62 have the primary particle average diameter of 90 nm or less and the BET value of 8 $m^2/g$ or more. It is more preferable that the carbon particles 62 have the primary particle average diameter of 90 nm or less and the BET value of 10 $m^2/g$ or more. It is still more preferable that the carbon particles 62 have the primary particle average diameter of 80 nm or less and the BET value of 10 $m^2/g$ or more.

When a total area ratio of the aggregates 63 in whole of the first electrode layer 11 and the second electrode layer 21 is small, following against the volume changing caused by discharge and charge may not be necessarily achieved. And so, it is preferable that the total area ratio has a lower limit. In concrete, it is preferable that the total area ratio of the aggregates 63 in the whole of the first electrode layer 11 and the second electrode layer 21 is 15% or more. It is more preferable that the total area ratio is 20% or more. It is still more preferable that the total area ratio is 25% or more.

When the total area ratio of the aggregates 63 in the whole of the first electrode layer 11 and the second electrode layer 21 is large, capacity reduction or the like may occur. And so, it is preferable that the total area ratio has an upper limit. In concrete, it is preferable that the total area ratio of the aggregates 63 in the whole of the first electrode layer 11 and the second electrode layer 21 is 60% or less. It is more preferable that the total area ratio is 50% or less. It is still more preferable that the total area ratio is 40% or less.

Figure 4:
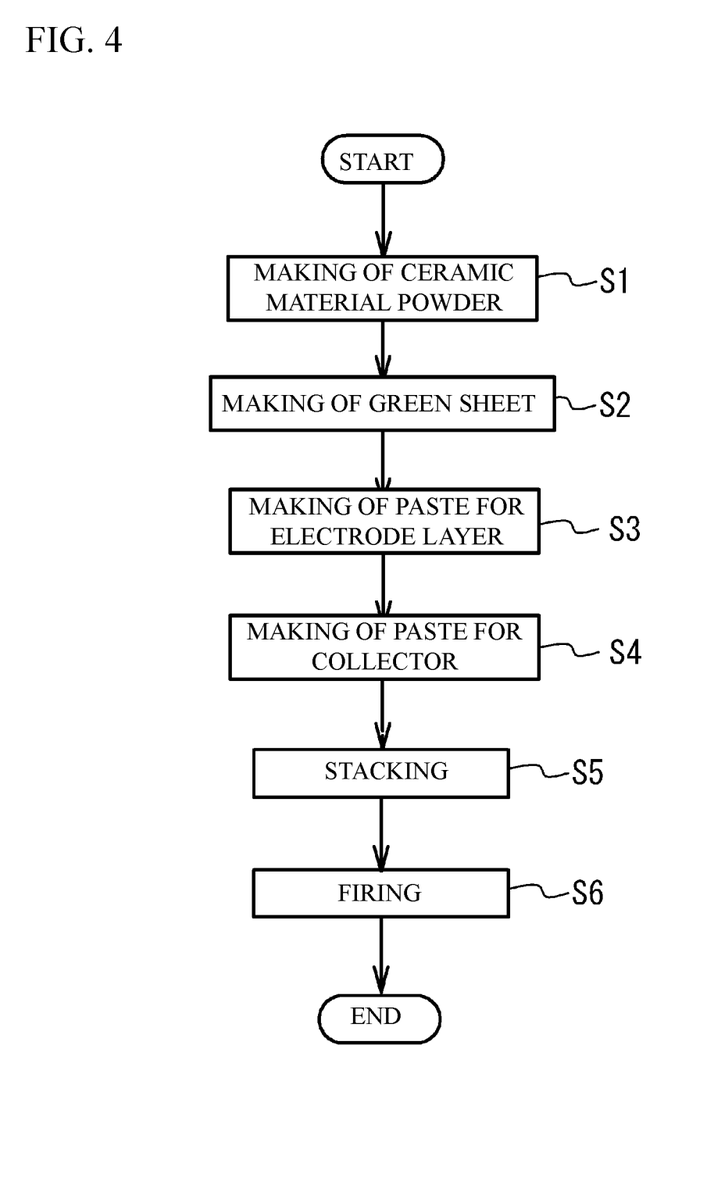
FIG. 4 illustrates a flowchart of a manufacturing method of an all solid battery.

FIG. 4 illustrates a flowchart of the manufacturing method of the all solid battery 100a.

(Making process of ceramic material powder) Phosphoric acid salt-based solid electrolyte powder for the solid electrolyte layer 30 is made. For example, it is possible to make the phosphoric acid-based solid electrolyte powder, by mixing raw material and additives and using solid phase synthesis method or the like. The resulting powder is subjected to dry grinding. Thus, a grain diameter of the resulting power is adjusted to a desired one. For example, it is possible to adjust the grain diameter to the desired diameter with use of planetary ball mill using $ZrO_2$ ball of 5 mm ∅.

The additive includes sintering assistant. The sintering assistant includes one or more of glass components such as Li—B—O-based compound, Li—Si—O-based compound, Li—C—O-based compound, Li—S—O-based compound and Li—P—O-based compound.

(Making process of green sheet) The resulting powder is evenly dispersed into aqueous solvent or organic solvent together with a binding agent, a dispersing agent, a plasticizer and so on. The resulting power is subjected wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

(Making process of paste for electrode layer) Next, paste for electrode layer is made in order to make the first electrode layer 11 and the second electrode layer 21. For example, an active material and solid electrolyte material are evenly dispersed by using a bead mill or the like. Thus, ceramic paste which includes only ceramic particles is made. Carbon paste including the carbon particles 62 which are not excessively dispersed. The ceramic paste and the carbon paste are mixed with each other. The carbon particles 62 are, for example, carbon black or the like.

It is possible to adjust dispersion condition of the carbon paste of the carbon paste by adjusting an added amount of a dispersant to an amount more than an optimum amount or an amount less than the optimum amount, or kneading the carbon paste by using a planetary mixer so that viscosity of the carbon paste is off optimum viscosity. When the ceramic paste and the carbon paste are mixed, it is important to mix them so that a shearing force is not excessively large. The ceramic paste and the carbon paste are mixed without the shearing force until aggregates of the carbon particles 62 disappear. In the mixing, when loosening level of the carbon particles 62 is enlarged, the aggregation diameter of the aggregate 63 becomes smaller. When the loosening level of the carbon particles 62 is reduced, the aggregation diameter of the aggregate 63 becomes larger. It is possible to adjust the aggregation diameter of the aggregate 63 of the carbon particles 62 by adjusting the loosening level, in this manner.

(Making process of paste for electric collector) Next, paste for electric collector is made in order to make the first electric collector layer 12 and the second electric collector layer 22. It is possible to make the paste for electric collector, by evenly dispersing powder of Pd, a binder, dispersant, plasticizer and so on into water or organic solvent.

(Stacking process) The paste for electrode layer and the paste for electric collector are printed on both faces of the green sheet, with respect to the all solid battery 100 illustrated in FIG. 1. The printing method is not limited. For example, a screen printing method, an intaglio printing method, a letter press printing method, a calendar roll printing method or the like may be used. In order to make a stacked device having a thin layer and a large number of stacked layers, the screen printing is generally used. However, an ink jet printing may be preferable when a micro size electrode pattern or a special shape is necessary.

Figure 5:
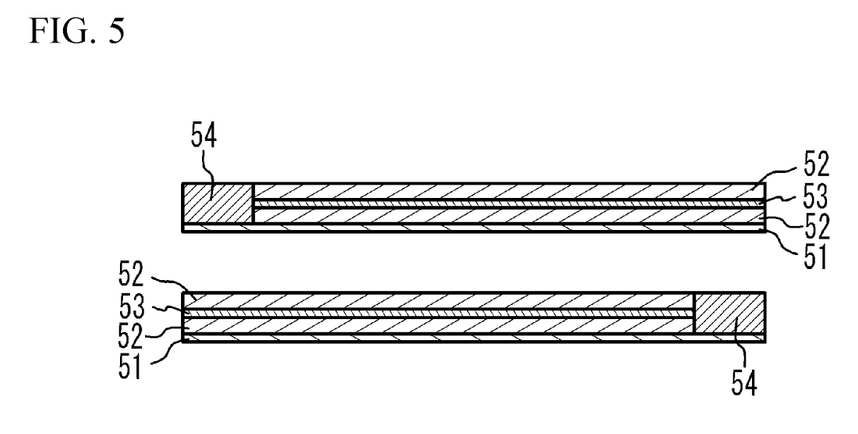
FIG. 5 illustrates a stacking process.

Paste 52 for electrode layer is printed on one face of a green sheet 51 as illustrated in FIG. 5, with respect to the all solid battery 100 illustrated in FIG. 2. Paste 53 for electric collector is printed on the paste 52 for electrode layer. And, another paste 52 for electrode layer is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, in the multilayer structure, a pair of the paste 52 for electrode layer and the paste 53 for electric collector are alternately exposed to the two edge faces of the multilayer structure.

(Firing process) Next, the obtained multilayer structure is fired. In the embodiment, it is preferable that an upper limit is determined in the oxygen partial pressure in the firing atmosphere, from a viewpoint of suppression of loss of the carbon material included in the paste of electrode layer. In concrete, it is preferable that the oxygen partial pressure in the firing atmosphere is $2 \times 10^{-13}$ atm or less. On the other hand, it is preferable that a lower limit is determined in the oxygen partial pressure in the firing atmosphere, from a viewpoint of suppression of the melting of the phosphoric acid salt-based solid electrolyte. In concrete, the oxygen partial pressure in the firing atmosphere is $5 \times 10^{-22}$ atm or more. When the range of the oxygen partial pressure is determined in this manner, it is possible to suppress the carbon material loss and the melting of the phosphoric acid salt-based solid electrolyte. An adjusting method of the oxygen partial pressure in the firing atmosphere is not limited.

After that, metal paste is applied to the two end faces of the multilayer chip 60. And, the metal paste is fired. Thus, the first external electrode 40a and the second external electrode 40b are formed. Alternatively, the multilayer chip 60 may be put in a dedicated tool so that the first external electrode 40a is spaced from the second external electrode 40b on the upper face, the lower face and the two side faces connected to the two end faces. And, electrodes may be formed by a sputtering. The first external electrode 40a and the second external electrode 40b may be formed by plating on the formed electrodes.

In the manufacturing method, the paste for electrode layer including the aggregate 63 of the carbon particles 62 is used. Therefore, as illustrated in FIG. 3, the aggregate 63 of the carbon particles 62 is located at crystal grain boundary between a plurality of the ceramic crystal grains 61. The cavity 64 of which at least a part is demarcated by the aggregate 63 is formed. Therefore, even if the carbon material is used, the ionic conductivity, the electron conductivity and the long-term cycle stability are improved. It is therefore possible to suppress the cost and improve the performance of the all solid battery 100 and the all solid battery 100a.

EXAMPLES

The all solid batteries in accordance with the embodiment were made and the property was measured.

(Example 1) $Co_3O_4$, $Li_2CO_3$, dihydrogen phosphate ammonium, $Al_2O_3$, $GeO_2$ were mixed and were used as solid electrolyte material powder. From the solid electrolyte material powder, $Li_{1.3}Al_{0.3}Ge_{1.7}(PO_4)_3$ including a predetermined amount of Co was made by a solid phase synthesizing. The resulting power was dry-crushed by $ZrO_2$ balls of 5 mm φ (30 min at a rotation speed of 400 rpm with use of planetary ball mil). The D90% grain diameter was 5 μm or less. Moreover, the resulting powder was wet-crushed (dispersing medium: ion exchange water or ethanol) with beads of 1.5 mm ϕ so that the D90% grain diameter was 3 μm. Further, the resulting powder was wet-crushed with beads of 1 mm φ so that the D50% grain diameter was 0.3 μm. Thus, solid electrolyte slurry having the D90% grain diameter of 2 μm or less was made. Solid electrolyte paste was obtained by adding a binder to the resulting slurry. And, green sheet having a thickness of 10 μm was made. $Li_{1.3}Al_{0.3}Ti_{1.7}(PO_4)_3$ including a predetermined amount of $LiCoPO_4$ was synthesized by a solid phase synthesizing as well as the above-mentioned oxide.

The resulting electrode active material and the solid electrolyte material were highly dispersed with use of wet-bead mill. Thus, ceramic paste including only ceramic grains was made. Next, carbon paste in which carbon black was not highly dispersed was made. The ceramic paste and the carbon paste were sufficiently mixed. Thus, paste for internal electrode layer was made. A primary particle average diameter of the carbon black was 20 nm. A BET value of the carbon black was 80 m²/g. An added amount of the carbon black was 5 wt % with respect to the glass ceramic component. An average aggregation diameter of the aggregate of the carbon black was 0.7 The average aggregation diameter of the aggregate was adjusted by loosening level of the carbon black. In the example 1, the loosening level was "large". The primary particle average diameter was calculated by taking some SEM images of only the carbon black so that the number of the carbon black was 100 or so in a single image and the total number of the carbon black was 400 or more and measuring a tangential diameter in a constant direction of 300 numbers or more of the carbon black and calculating an average of the tangential diameters. The BET value of the carbon black was measured by a BET one point method by using Macsorb HM model-1200 series, nitrogen gas and nitrogen-helium (30 mol %) mixed gas. A sample amount of the carbon black was measured so that an actual measured value was 1 to 50 m². The sample carbon black was housed in a glass cell. The sample carbon black was heated for 15 minutes at 200 degrees C., while nitrogen gas was flown in the glass cell. Thus, absorbed water was removed from the sample carbon black. After that, the resulting sample carbon black was subjected to the BET measurement. The carbon black paste of 0.001 g was dispersed in ethanol of 50 ml in an ultrasonic bath for 3 minutes. After that, the diameter of the aggregate was measured by using ELSZ-2000S made by Otsuka Electronics Co., Ltd. The measured diameter was treated as the aggregation diameter.

Next, a plurality of green sheets were stacked. The stacked green sheets were used as a solid electrolyte layer. The paste for electrode layer was stacked on both an upper face and a lower face of the solid electrolyte layer. The resulting structure was stamped into a rectangular board shape of □10 mm. The board shape structure was used as a sample. The samples were fired. The firing temperature was 700 degrees C. The oxygen partial pressure during the firing process was $10^{-13}$ atm or less at a temperature of 500 degrees C. or less.

(Example 2) The loosening level of the carbon black was "middle". The average aggregation diameter of the aggregate was 2.5 μm. Other conditions were the same as those of the example 1.

(Example 3) The added amount of the carbon black was 25 wt % with respect to the glass ceramic component. The loosening level of the carbon black was "middle". The average aggregation diameter of the aggregate was 3.8 μm. Other conditions were the same as those of the example 1.

(Example 4) The added amount of the carbon black was 30 wt % with respect to the ceramic component. The loosening level of the carbon black was "middle". The average aggregation diameter of the aggregate was 7.4 μm. Other conditions were the same as those of the example 1.

(Example 5) The loosening level of the carbon black was "small". The average aggregation diameter of the aggregate was 8.9 μm. Other conditions were the same as those of the example 1.

(Example 6) The primary particle average diameter of the carbon black was 80 nm. The BET value of the carbon black was 10 m²/g. The loosening level of the carbon black was "small". The average aggregation diameter of the aggregate was 9.5 μm. Other conditions were the same as those of the example 1.

(Comparative example 1) The loosening level of the carbon black was "maximum". The average aggregation diameter of the aggregate was 0.3 μm. Other conditions were the same as those of the example 1.

Figure 6:
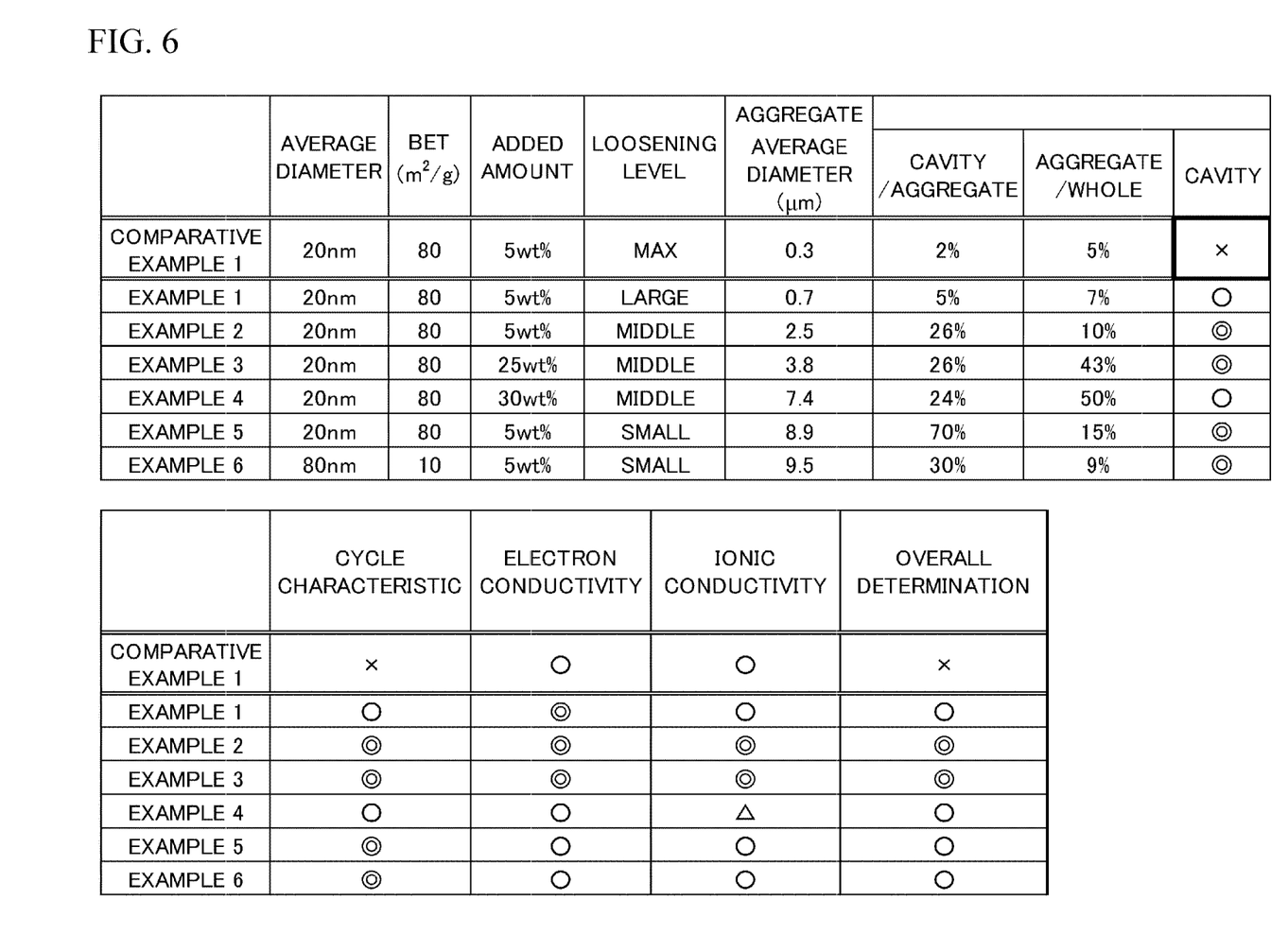
FIG. 6 illustrates results of examples 1 to 6 and comparative examples 1 and 3.

(Analysis) Some SEM images of the electrode layer processed by a cross section polisher were taken. BSE (Back Scattering Electron) images were used for the SEM images analysis. Some SEM images were taken with a magnification of 10000 or the like so that the number of the carbon aggregate particles was 400 or more. ImageJ Fiji: Schneider, C. A., Rasband, W. S., Elieiri, K. W. "NIH Image to ImageJ: 25 years of image analysis." Nature Methods 9, 671-675, 2012 was used for an image analysis software. Dispersion condition of the carbon black was analyzed. Existence of a cavity demarcated by a carbon aggregate was analyzed. A ratio of a total area of the carbon aggregate particles with respect to a measured area was analyzed. A ratio of a total area of cavities in carbon aggregates with respect to the total area of the carbon aggregates was analyzed. FIG. 6 illustrates the results.

(Existence of cavity) In the examples 1 to 6, the carbon black aggregate and a cavity of which at least a part is demarcated by the carbon black aggregate were observed, In the comparative example 1, the cavity of which at least a part is demarcated by the aggregate was not observed. The examples 2, 3, 5 and 6 were determined as very good "⊚". The examples 1 and 4 were determined as good "○". The comparative example 1 was determined as bad "X"

(Cavity/Aggregate) The area ratio of the cavity in the aggregate was 5% in the example 1. The area ratio of the example 2 was 26%. The area ratio of the example 3 was 26%. The area ratio of the example 4 was 24%. The area ratio of the example 5 was 50%. The area ratio of the example 6 was 30%. The area ratio of the comparative example 1 was 2%.

(Aggregate/whole) The volume ratio of the aggregate with respect to the whole of the electrode layers was 7% in the example 1. The volume ratio was 10% in the example 2. The volume ratio was 43% in the example 3. The volume ratio was 50% in the example 4. The volume ratio was 15% in the example 5. The volume ratio was 9% in the example 6. The volume ratio was 5% in the comparative example 1.

(Cycle characteristic) Cycle characteristic was measured with respect to the examples 1 to 6 and the comparative example 1. The cycle characteristic of the examples 1 and 4 was determined as good "○". The cycle characteristic of the examples 2, 3, 5 and 6 was determined as very good "⊚". The cycle characteristic of the comparative example 1 was determined as bad "X". In one cycle, charge and discharge were performed at 25 degrees C., within a voltage range of 2.7 V to 0 V and with 1 C. When discharge capacity with respect to an initial discharge capacity after 100 cycles was 80% or more, the cycle characteristic was determined as very good "⊚". When the discharge capacity with respect to the initial discharge capacity after 100 cycles was 60% or more, the cycle characteristic was determined as good "○". When the discharge capacity with respect to the initial discharge capacity after 100 cycles was less than 60%, the cycle characteristic was determined as bad "X".

(Electron conductivity) The electron conductivity was measured with respect to the examples 1 to 6 and the comparative example 1. The electron conductivity of the examples 1 to 3 was determined as very good "⊚". The electron conductivity of the examples 4 to 6 and the comparative example 1 was determined as good "◯". A pellet having a diameter of 10 mm Φ and a thickness of 2 mm was made from mixed powder in which the electrode paste was dried. And, a sintered structure was made with the same method as the all solid battery. A gold electrode was formed on an upper face and a lower face of the sintered structure by sputtering. And conductivity was measured. When the conductivity was $10^0$ S/cm or more, the electron conductivity was determined as very good "⊚". When the conductivity was $10^{-4}$ to $10^{-1}$ S/cm, the electron conductivity was determined as good "◯". When the conductivity was $10^{-4}$ S/cm or less, the electron conductivity was determined as bad "X".

(Ionic conductivity) The ionic conductivity was measured with respect to the examples 1 to 6 and the comparative example 1. The ionic conductivity of the examples 1 and 2 was determined as very good "⊚". The ionic conductivity of the examples 3, 5 and 6 was determined as good "◯". The ionic conductivity of the example 4 was determined as so-so "Δ". A pellet having a diameter of 10 mm Φ and a thickness of 2 mm was made from mixed powder in which the electrode paste was dried. A solid electrolyte layer having a thickness of 10 μm was formed on an upper face and a lower face of the pellet. And, a sintered structure was made with the same method as the all solid battery. A gold electrode was formed on an upper face and a lower face of the sintered structure by sputtering. And conductivity was measured. When the conductivity was $10^{-5}$ S/cm or more, the ionic conductivity was determined as very good "⊚". When the conductivity was $10^{-6}$ to $10^{-6}$ S/cm, the ionic conductivity was determined as good "◯". When the conductivity was $10^{-6}$ S/cm or less, the ionic conductivity was determined as bad "x".

(Overall determination) Overall determination of the example of which the number of "X" of the cycle characteristic, the electron conductivity and the ionic conductivity was zero was OK. The example of which the overall determination was OK and of which at least one of the determinations was good "◯" or "Δ" was determined as very good "◯". The example of which the overall determination was OK and of which the three determinations were very good "⊚" was determined as very good "⊚". The example of which the overall determination was OK and of which at least one of the determinations was bad "X" was determined as bad "X".

Overall determination of the examples 1 to 6 was OK. It is thought that this was because an aggregate of carbon particles was formed in the electrode layer, and a cavity of which at least a part was demarcated by the aggregate was formed. Overall determination of the comparative example 1 was NG. It is thought that this was because there was no cavity of which at least a part was demarcated by an aggregate.

In comparison with the examples 1 and 4, the cycle characteristic of the examples 2, 3, 5 and 6 was determined as very good "⊚". It is thought that this was because the area ratio of the cavity in the aggregate was 25% or more. The ionic conductivity of the examples 1 and 2 was determined as very good "⊚". It is thought that this was because the added amount of the carbon was small and the aggregation diameter was appropriate, the prevention of sintering was suppressed, the ceramic component was densified, and the ionic conductivity was improved.

Although the embodiments of the present invention have been described in detail, it is to be understood that the various change, substitutions, and alterations could be made hereto without departing from the spirit and scope of the invention.

What is claimed is:

1. An all solid battery comprising:
    a solid electrolyte layer of which a main component is oxide-based solid electrolyte;
    a first electrode layer that is provided on a first main face of the solid electrolyte layer and includes an active material; and
    a second electrode layer that is provided on a second main face of the solid electrolyte layer and includes an active material,
    wherein the solid electrolyte layer, the first electrode layer and the second electrode layer have a sintered structure,
    wherein at least one of the first electrode layer and the second electrode layer includes a plurality of aggregates of carbon particles and each of the plurality of aggregates encloses a respective cavity,
    wherein the plurality of aggregates are spaced from each other,
    wherein, in a cross section of the first electrode layer, at least one of the cavities is enclosed all around by only the corresponding plurality of aggregates without any other material,
    wherein an area ratio of the at least one cavity in the at least one of the plurality of aggregates is 26% or more and 50% or less, in a cross section of the at least one of the plurality of aggregates.

2. The all solid battery as claimed in claim 1, wherein an aggregation diameter of the at least one of the plurality of aggregates is 0.5 μm or more and 50 μm or less.

3. The all solid battery as claimed in claim 1, wherein a diameter of the at least one cavity is 0.2 μm or more and 10 μm or less.

4. The all solid battery as claimed in claim 1, wherein a ratio of a weight of the carbon particles with respect to a weight of a ceramic component in the at least one of the first electrode layer and the second electrode layer is 5% or more and 80% or less.

5. The all solid battery as claimed in claim 1, wherein the carbon particles have a primary particle average diameter of 15 nm or more and 90 nm or less and have a BET value of 8 $m^2$/g or more and 200 $m^2$/g or less.

6. The all solid battery as claimed in claim 1, wherein a ratio of a total area of the aggregate with respect to a whole of the electrode layer in the at least one of the first electrode layer and the second electrode layer is 15% or more and 60% or less.

7. The all solid battery as claimed in claim 1, wherein an aggregation diameter of the plurality of aggregate is 0.7 μm or more and 9.5 μm or less.

8. The all solid battery as claimed in claim 1, wherein an area ratio of the at least one cavity in the at least one of the plurality of aggregates is 5% or more and 50% or less.

9. The all solid battery as claimed in claim 1, wherein a ratio of a total area of the at least one of the plurality of aggregates with respect to a whole of the electrode layer in the at least one of the first electrode layer and the second electrode layer is 7% or more and 50% or less.

10. The all solid battery as claimed in claim 1, wherein the solid electrolyte layer includes a glass component.

11. The all solid battery as claimed in claim 1,
    wherein an aggregation diameter of the plurality of aggregate is 2.5 μm or more and 9.5 μm or less, and
    wherein a ratio of a total area of the plurality of aggregate with respect to a whole of the electrode layer of the at least one of the first electrode layer and the second electrode layer is 9% or more and 43% or less.

* * * * *